INVENTOR.
HERBERT B. HINDIN
BY
ATTORNEY.

March 12, 1968

H. B. HINDIN 3,373,066

METHOD AND INTERMEDIATE ARTICLE OF MANUFACTURE FOR MAKING RADIAL TIRES

Filed Jan. 2, 1964

INVENTOR.
HERBERT B. HINDIN
BY
*Harvey E Bumgardner*
ATTORNEY.

United States Patent Office 3,373,066
Patented Mar. 12, 1968

3,373,066
METHOD AND INTERMEDIATE ARTICLE OF MANUFACTURE FOR MAKING RADIAL TIRES
Herbert B. Hindin, Southfield, Mich., assignor to Uniroyal, Inc., a corporation of New Jersey
Filed Jan. 2, 1964, Ser. No. 335,162
8 Claims. (Cl. 156—128)

ABSTRACT OF THE DISCLOSURE

This application discloses a method of making a radial tire including a single building stage wherein the radial body ply or plies are applied conventionally to the building drum, a breaker comprised of an even number of low bias cut angle cord plies is subsequently applied thereon, the breaker plies being lubricated except for a narrow central circumferential strip which is left tacky, and the building of the tire is thereafter completed followed by the forming and curing of the tire. It also discloses the intermeditae article of said method before the forming of the tire.

---

This invention relates to a novel method of manufacture of so-called radial tires and to an intermediate article of manufacture constructed in accordance with the practice of said method.

More particularly, the invention relates to a method of manufacture of radial tires whereby the entire uncured tire may be built, in one stage, on a conventional tire building drum and may thereafter be formed and cured, in a single operation, in a conventional forming and curing press. It further relates to the construction of the unformed, uncured tire as an intermediate article of manufacture.

The expression, "radial tires," as commonly used in the pneumatic tire art, may be said to include various tire constructions having one or more body plies of weftless tire cord fabric extending from bead to bead, wherein the cords in each ply are substantially radial in orientation, that is, the cords are oriented substantially normal to the beads and crown center line of the tire. In monoply radial tire construction, the cords will normally have a ninety degree bias angle, that is, in the unformed carcass, they will run perpendicular to the planes of the beads. In a two-ply radial tire construction, the cords in each ply may be oriented at oppositely disposed small angles of up to ten degrees with respect to truly normal orientation, in which case the respective plies would be said to have oppositely disposed bias angles of more than eighty degrees. In four-ply or heavier tire construction, similar opposed orientation of the cords in successive body plies would be employed. All of said constructions are contemplated within the scope of this invention, and the expressions "radial tire" and "substantially radially oriented" as used herein.

In all radial tire constructions, good design requires the superimposition of one or more breaker plies of weftless tire cord fabric over the body plies in the tread area of the tire. The cords in these breaker plies are preferably cut on a low bias cut angle, that is, they form a relatively small angle with the crown center line and beads of the tire. While occasionally, breakers consisting of truly circumferential cords are employed, this invention contemplates the employment of low bias angle breaker plies. If multiple breaker plies are employed, the cords in successive plies will be oriented at oppositely disposed angles with respect to the crown center line of the tire. Bias cut breaker plies having bias cut angles, in the unformed tire, of from 25 degrees to 35 degrees with respect to the crown center line of the tire are contemplated as lying within the meaning of the expressions "low bias angle breakers" and "low bias cut angle breakers" as used herein.

Radial tires are conventionally built in a two-stage operation. In the first building stage, the body plies are applied to a conventional tire building drum, the beads are set, and the body plies are turned up about the beads. Next, the unformed body is removed from the drum and formed or expanded into a toroidal shape. Then, in a second building stage, the breaker plies are applied to the formed body and the tread is superimposed thereupon. This two-stage building has been necessitated by the fact that any low bias angle breaker plies built into the unformed tire on the drum would necessarily have to be stretched considerably in circumference during the forming of the tire. While some of this stretch can be accomplished, as in the forming of the body plies of conventional tires, by the cords in the breaker plies assuming a more nearly circumferential orientation and moving closer together, some of it is necessarily, because of the low bias angle of the breaker plies, accomplished by the parallel slippage as well as the pivoting action of the cords in the breaker plies. When, in the past, it has been attempted to form completely drum-built radial tires containing low angle breakers, it has been found that the adhesion of the breaker ply cords to the adjacent tire components resulted in uneven movement of the cords and consequent malformation of the tires.

Also in the past, it has been suggested in the art that various components of a drum-built, unformed, uncured pneumatic tire might be coated with a lubricant such as zinc stearate which would facilitate independent movement of adjacent tire components during forming and which would thereafter be absorbed into the rubber of the tire during cure to result in a completely bonded structure. See, for example, United States Patent No. 1,871,438 to Abbott wherein the application of zinc stearate to the crown region of the body plies is taught.

Early experiments in the application of a suitable lubricant to the breaker plies of completely drum-built radial tires resulted in failure. The lubricant was applied to the entire surfaces of the breaker plies, and it was found that, when such tires were thereafter formed, the movement or slippage of the breaker plies was erratic and uncontrolled so that the breakers in the cured tires were not uniformly distributed in the cured tire and oriented as required in acceptable constructions. Such tires were totally unuseable.

In accordance with the present invention, it has been found that completely drum-built radial tires containing low bias cut angle breakers, both surfaces of each of which have been lubricated except for a narrow, central circumferential strip of each said surface, can be formed without uncontrolled slippage, without distortion and without abrupt cord angle change at the edge of the unlubricated zone, the result being a commercially acceptable tire. Further, it has been found that similar results are obtained when the breaker plies are first adhered to each other to form a belt or pocket and the outer surfaces of the breaker pocket are each, except for a narrow central circumferential strip on each surface, lubricated prior to assembly of the pocket with the unformed tire.

One of the advantages of the method of this invention becomes readily apparent when it is considered that the entire radial tire may be drum-built in a single stage and on a single conventional building drum without an intermediate forming operation. A further obvious advantage of both the method and of the uncured, unformed tire as an intermediate article of manufacture is that the tire may, thereafter, be formed and cured in a single operation in a conventional tire forming and curing press.

Accordingly, it is an object of this invention to provide a novel method of manufacture for radial tires wherein the entire tire may be built in a single building stage prior to forming and curing.

Another object of this invention is to provide, as an intermediate article of manufacture, a complete unformed, uncured radial tire of novel structure which may be formed and cured in a single operation.

Other objects and advantages of the present invention will become apparent from the following description when read in conjunction with the accompanying drawings wherein, FIG. 1 is a schematic, partially sectional view of a tire building drum with the first substantially radially oriented body ply applied thereto.

Figure 5:
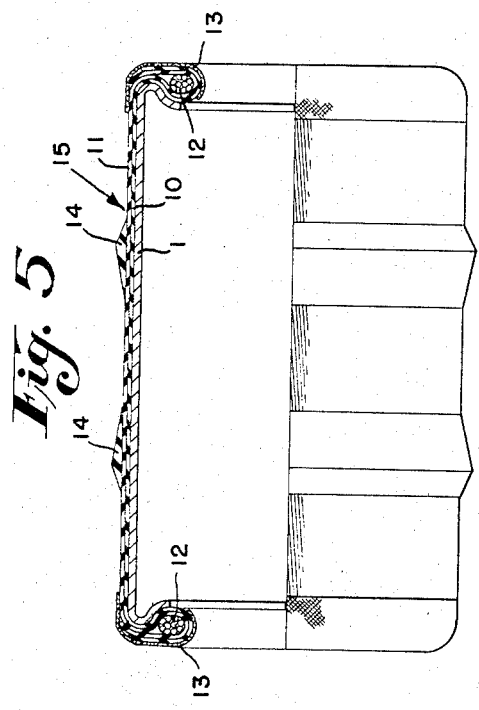
FIG. 5 shows, partially sectioned, the drum and carcass of FIG. 4 with the filler strips applied.
Figure 7:
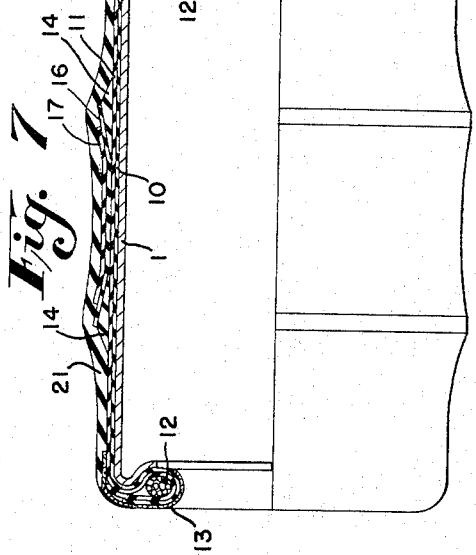
FIG. 7 is a partially sectioned view of the completed, unformed tire on the drum.
Figure 6:
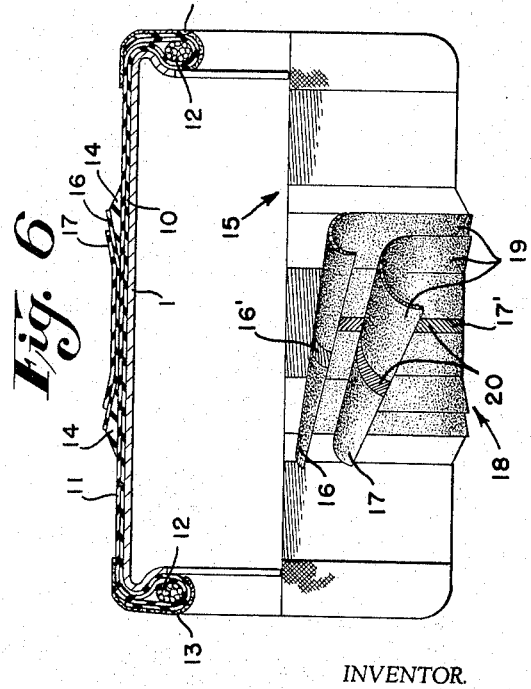
FIG. 6 is a schematic view of the drum and uncompleted tire of FIG. 5, partially sectioned, showing the application of the breaker plies to the uncompleted tire.

Referring now to the drawings, wherein like reference numerals denote corresponding parts throughout the several views, FIGS. 1 through 7 show successive intermediate stages of completion in the building of a preferred form of two-ply radial tire in accordance with practice of the method of the invention, FIGS. 1–5 showing the building of the body ply layer, FIG. 6 showing the application of the breaker layer to the body ply layer and FIG. 7 showing the completed, unformed, uncured tire with the tread layer applied.

Figure 1:
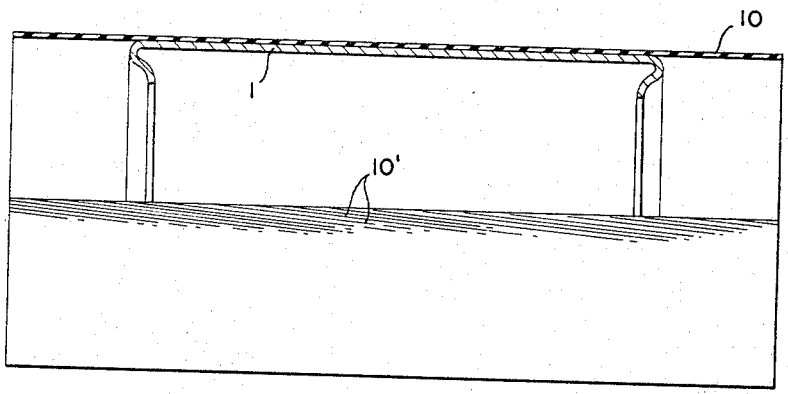

In FIG. 1 is shown schematically a conventional tire building drum 1 with the first body ply 10 of rubber coated weftless tire cord fabric applied thereto. It will be noted that the cords 10' of this first body ply 10 are substantially radially oriented, being disposed at an angle of no greater than ten degrees with respect to the axis of the drum 1, that is, the first body ply 10 has a bias cut angle of not less than eighty degrees.

Figure 2:
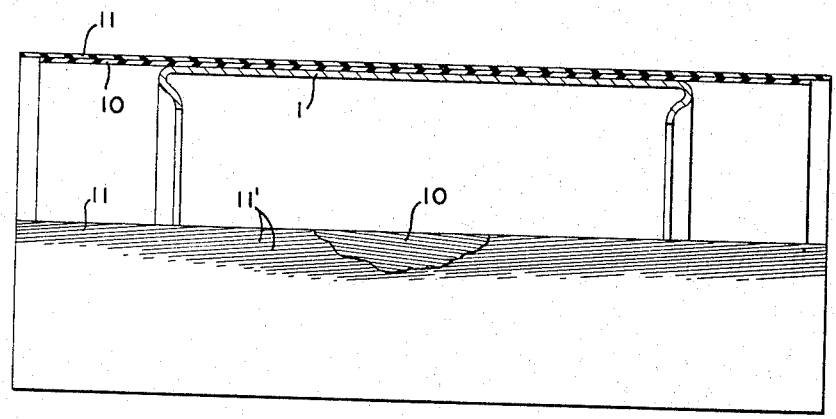
FIG. 2 is a similar view, partially sectioned and partially broken away, showing the second substantially radially oriented body ply applied over the first.

In FIG. 2, the second body ply 11 of rubber coated weftless tire cord fabric has been applied and adhered to the outer surface of the first body ply 10. The cords 11' of the body ply 11 are also substantially radially oriented, being oppositely disposed at a large bias cut angle corresponding to the bias cut angle of the first body ply 10.

Figure 3:
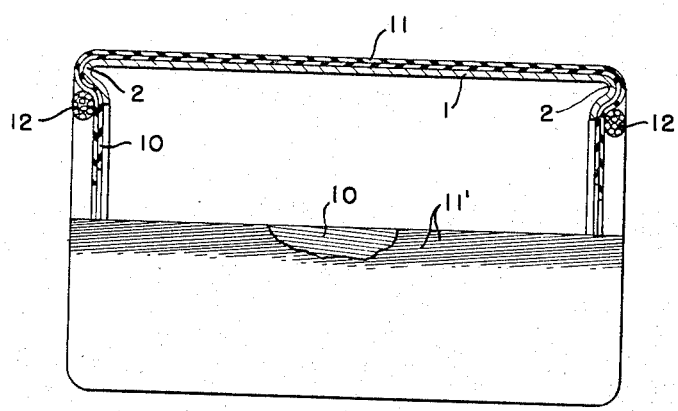
FIG. 3 is a view similar to FIG. 2 wherein the plies have been turned to form shoulders and the beads have been applied thereto.

In FIG. 3, the ends of the body plies 10 and 11 have been turned down over the shoulders 2 of the drum 1, and the beads 12 have been adhered or set against the outer body ply 11.

Figure 4:
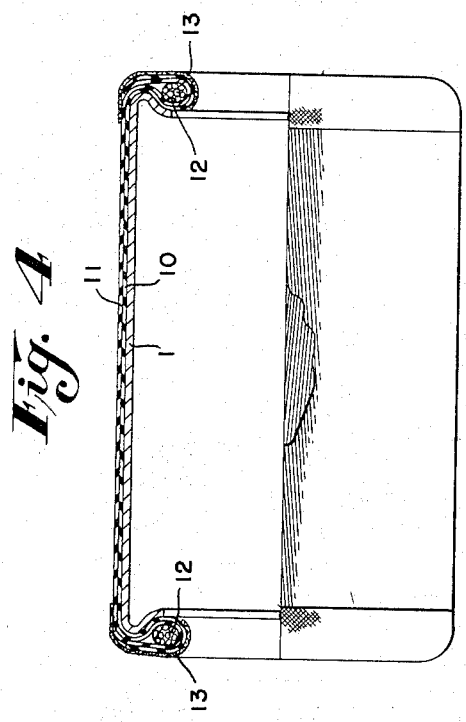
FIG. 4 is a view similar to FIG. 3 wherein the ply ends have been turned up about each bead and the chafer strips have been applied.

In FIG. 4, the ends of the body plies 10 and 11 have been turned up about the beads 12 and adhered to the carcass, and the chafer strips 13 have been adhered to the carcass over the bead regions thereof. Up to this point, at least, the steps of the method of the present invention correspond to those of the pre-existing two-stage building method for two-ply radial tires.

In FIG. 5, two circumferential rubber filler strips 14 have been applied and adhered to the second body ply 11 at the edges of the tread region of the tire. It is the function of these filler strips 14 to position the breakers in the formed and cured tire substantially equidistant at all points from the tread surface of the tire. For the sake of convenience, the entire partially built tire 15, as shown in FIG. 5 (or its equivalent in other radial tire constructions) will be referred to herein as the "body ply layer."

In FIG. 6, first and second low bias cut angle breaker plies 16 and 17 of rubber coated weftless tire cord fabric, together comprising the "breaker layer" 18, are shown independently applied, respectively, to the body ply layer 15 and the first breaker ply 16 in central superimposed position. The cords 16' and 17' of the respective breaker plies 16 and 17 are oriented at oppositely disposed bias cut angles in the approximate range of from twenty-five to thirty-five degrees with respect to a circumferential line on the unformed carcass corresponding to the crown center line of the completed tire. The bias cut angle of the breaker plies is limited by the following considerations. Too small a bias cut angle will result in an unmanageably wide breaker. Too large a bias cut angle will result in a finished tire having less than the requisite substantial perpendicularity of breaker cords with respect to body cords and a correlatively weak tire structure.

Prior to this application to the incompleted tire, both the inner and outer surfaces of each of the breaker plies 16 and 17 have been coated with a suitable lubricant 19 to prevent the adherence of the breaker plies 16 and 17 to each other and to the adjacent tire components. A narrow central circumferential strip 20 on each surface of each breaker ply 16 and 17 has been left uncoated so that each breaker strip 16 and 17 may, to this limited extent, be securely adhered to its adjoining tire components and thereby fixedly positioned in the uncured tire. A preferred width for these unlubricated strips 20 is believed to be approximately 1¼", but widths of from ½ to 1½" have been found to be satisfactory. Too wide strips result in uneven shifting and distortion of the breaker cords during the forming of the tire, whereas too narrow strips will result in shifting of one or both breakers to crooked or non-circumferential positions during the forming of the tire. The lubrication, in the above described manner, of the inner surface of the first or inner breaker ply, the outer surface of the second or outer breaker ply and either the outer surface of the inner breaker ply or the inner surface of the outer breaker ply will result in a completely equivalent method and structure to that described with reference to the preferred form of the invention herein and is intended to be covered by the claims herein to said preferred form.

The lubricant used must prevent the adherence of adjacent tacky uncured rubber surfaces in the uncured tire, but must be absorbed into the rubber during cure to permit a completely cohesive bonding of all tire components. Stearic acid has been found suitable for this purpose, and various other suitable lubricants including high abrasion furnace black, petrolatum and zinc stearate have been found to give satisfactory results.

In FIG. 7, the unformed, uncured tire is shown completed by the application of the usual tread slab 21 which is adhered to the body ply layer 15 and to the central unlubricated strip 20 of the outer breaker ply 17.

Figure 10:
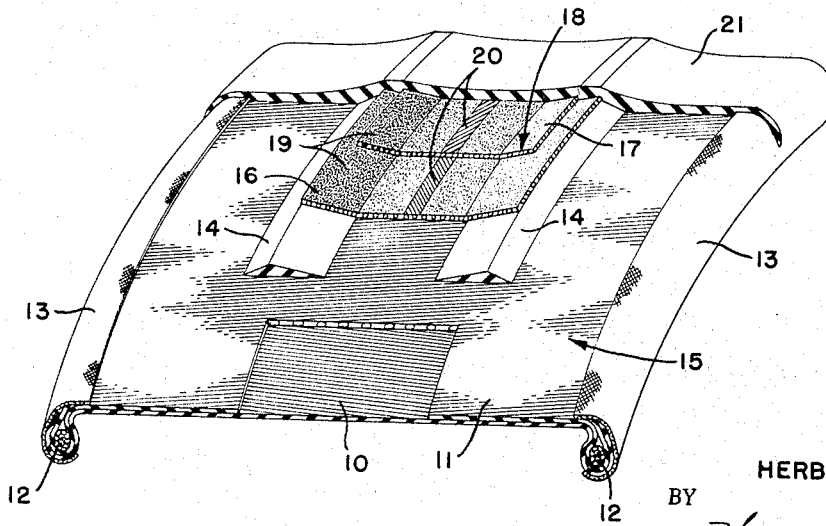
FIG. 10 is an isometric view of a portion of the completed unformed tire of FIG. 7 partially sectioned and partially broken away to show the details of construction thereof.

The preferred form of the unformed, uncured tire, which comprises the preferred form of the intermediate article of manufacture of this invention is shown in greater detail in FIG. 10. It comprises a body ply layer 15, a tread layer 21 and a breaker layer 18 interposed therebetween. In the preferred form of the invention for a two-ply radial tire, the body ply layer 15 includes two body plies 10 and 11 of rubber coated weftless tire cord fabric, the cords of said respective plies 10 and 11 being oppositely directed and oriented on relatively large bias cut angle, to wit: a bias cut angle greater than eighty degrees. The breaker layer 18 includes two oppositely biased low bias cut angle breaker plies 16 and 17 of rubber coated weftless tire cord fabric each coated on both surfaces thereof, except for a narrow central circumferential strip 20 on each said surface, with a lubricant 19 to prevent adherence of said surfaces of said breaker plies 16 and 17, in the uncured state, to each other and to the adjacent uncured tire components.

Figure 9:
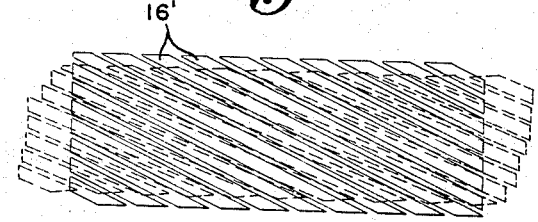
FIG. 9 is a schematic view of a portion of one of the breaker plies of the tire of FIG. 7 showing the cords thereof before and after the forming of the tire.

The uncured tire, as shown in FIGS. 7 and 10, may be formed and cured in a single operation in a conventional tire forming and curing press. Because the initial forming occurs as the press is closed and before there is a build-up of heat in the uncured tire to curing temperature, the lubricant 19 will permit the cords 16′ and 17′ of the respective breaker plies 16 and 17 to slide easily and uniformly as the breakers 16 and 17 are stretched. In FIG. 9, a small increment of one breaker ply 16 has been shown schematically both before and after forming. The cords 16′ are shown in solid lines in their relative positions before forming of the uncured tire and in dotted lines in their corresponding positions after forming of the tire.

Figure 8:
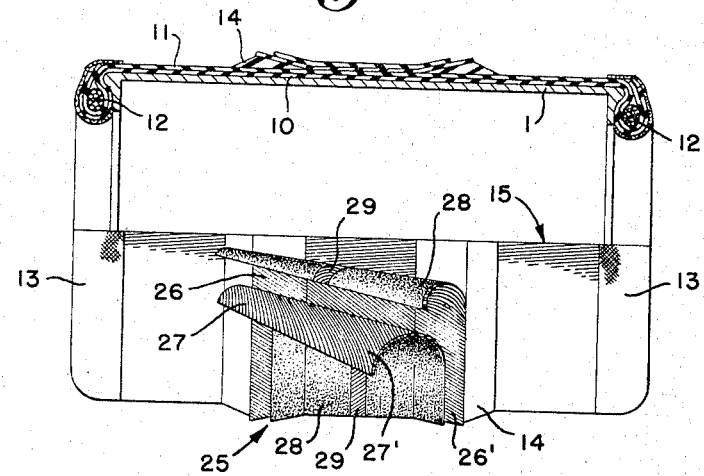
FIG. 8 is a view similar to FIG 6 showing a modified form of the invention.

In FIG. 8, which corresponds to FIG. 6, an alternative method and construction in accordance with the invention have been shown also for a two-ply radial tire. In this alternative form of the invention, the body ply layer 15 is built in the same manner as has been previously described for the preferred form of the invention. Next, a breaker belt or pocket 25 is separately formed by adhering together, in the arrangement shown in the drawing, two low bias cut angle breaker plies 26 and 27 of rubber coated weftless tire cord fabric, the bias cut cords 26′ and 27′ in the respective breaker plies 26 and 27 being oriented at opposite bias angles with respect to a circumferential line corresponding to the crown center line of the tire. Then both surfaces of the prefabricated breaker belt or layer 25 are coated with a lubricant 28 such as stearic acid except for a narrow central circumferential strip 29 on each surface of the belt 25. The pocket 25 may then be slipped onto the drum 1 and centrally adhered to the body ply layer 15 by the unlubricated strip 29 on the inner surface of the pocket 25. The tire is then finished in the manner described for the preferred form of the invention.

Although the breaker plies 26 and 27 are adhered together in this alternate form of the inventon, it would appear that, because of the lubricant 28 between the breaker layer 25 and the adjacent tire components, substantially as good results are obtained in the forming and curing of the tire as in the preferred form of the invention.

From the foregoing, it is believed that the method of practicing the invention and the intermediate article of manufacture which results therefrom will be readily comprehended by those skilled in the art. It is clearly to be understood, however, that various changes in the method shown and described and in the construction of the intermediate article of manufacture as outlined above may be resorted to without departing from the spirit of the invention as defined by the appended claims.

Having thus described my invention, what I claim and desire to protect by Letters Patent is:

1. In a method of making radial tires, the steps including:
   (a) building on a drum a body ply layer comprised of at least one body ply of rubber coated weftless tire cord fabric, all of the cords in said layer being substantially radially oriented;
   (b) applying, exterior to said body ply layer, a breaker layer comprised of at least two low bias cut angle breaker plies of rubber coated weftless tire cord fabric, the inner and outer surfaces of said breaker layer being, except for a narrow central circumferential strip on each said surface, coated with a lubricant to prevent the adherence of said breaker layer to the adjacent layers of the uncured tire;
   (c) applying, exterior to said breaker layer, a tread layer,
   (d) forming the tire; and
   (e) curing the tire while simultaneously absorbing said lubricant into the rubber of the tire, whereby all layers are uniformly vulcanized together.

2. The method of claim 1 wherein the unlubricated circumferential strips on the breaker layer are from one-half inch to one and one-half inches in width.

3. The method of claim 1 wherein the unlubricated circumferential strips on the breaker layer are approximately one and one-quarter inches wide.

4. In a method of making radial tires, the steps including:
   (a) building on a drum a body ply layer comprised of at least one body ply of rubber coated weftless tire cord fabric, all of the cords in said layer being substantially radially oriented;
   (b) applying, exterior to said body ply layer, a plurality of low bias cut angle breaker plies of rubber coated weftless tire cord fabric, each said breaker ply being bias cut at an angle opposed to the bias cut angle of each adjacent breaker ply, the inner and outer surfaces of each said breaker ply being, except for a narrow central circumferential strip on each said surface, coated with a lubricant to prevent the adherence of said breaker plies to each other and to the adjacent layers of the uncured tire;
   (c) applying, exterior to said breaker plies, a tread layer;
   (d) forming the tire; and
   (e) curing the tire while simultaneously absorbing said lubricant into the rubber of the tire, whereby all layers are uniformly vulcanized together.

5. The method of claim 4 wherein the non-lubricated circumferential strips on each breaker ply are from one-half inch to one and one-half inches in width.

6. The method of claim 4 wherein the non-lubricated circumferential strips on each breaker ply are approximately one and one-fourth inches in width.

7. As an intermediate article of manufacture, an unshaped, uncured, drum-built pneumatic tire carcass comprising:
   (a) a body ply layer including at least one ply of rubber coated weftless tire cord fabric, all of the cords in said body ply layer being substantially radially oriented;
   (b) a rubber tread layer exterior to said body ply layer;
   (c) a breaker layer interposed between said body ply layer and said tread layer, said breaker layer including at least two low bias cut angle breaker plies of rubber coated weftless tire cord fabric;
   (d) the surfaces of said breaker layer in contact with said body ply layer and said tread layer being, except for a narrow central circumferential strip on each said surface, coated with a lubricant capable of being absorbed into the rubber of the tire during cure, to prevent the adherence of said breaker layer to said body ply layer and said tread layer during the forming of the tire.

8. As an intermediate article of manufacture, an unshaped, uncured, drum-built pneumatic tire carcass comprising:
   (a) a body ply layer including at least one ply of rubber coated weftless tire cord fabric, all of the cords in said body ply layer being substantially radially oriented;
   (b) a rubber tread layer exterior to said body ply layer;

(c) a plurality of low bias cut angle breaker plies of rubber coated weftless tire cord fabric lying adjacent to each other and interposed between said body ply layer and said tread layer, the cords of adjacent breaker plies being oriented at oppositely disposed bias cut angles;

(d) the surfaces of each said breaker ply being, except for a narrow central circumferential strip on each said surface, coated with a lubricant capable of being absorbed into the rubber of the tire during cure to prevent adherence of said breaker plies to each other and to the adjacent tire components during the forming of the tire.

References Cited

UNITED STATES PATENTS

| | | | |
|---|---|---|---|
| 1,507,743 | 9/1924 | Kratz | 152—356 X |
| 1,871,438 | 8/1932 | Abbott | 156—131 |
| 2,432,630 | 12/1947 | Purdy | 152—356 |
| 2,703,128 | 3/1955 | Darrow | 152—356 |
| 2,884,044 | 4/1959 | Hulswit et al. | 156—128 |
| 3,057,391 | 10/1962 | Williams | 152—356 |
| 3,244,213 | 4/1966 | McMannis | 152—354 |

EARL M. BERGERT, *Primary Examiner.*

H. ANSHER, *Assistant Examiner.*